United States Patent
Shafet et al.

(10) Patent No.: US 11,188,647 B2
(45) Date of Patent: Nov. 30, 2021

(54) SECURITY VIA WEB BROWSER TAMPERING DETECTION

(71) Applicant: PayPal, Inc., San Jose, CA (US)

(72) Inventors: Yuri Shafet, Beer Sheva (IL); Ilya Chernyakov, Givat Shmuel (IL)

(73) Assignee: PayPal, Inc., San Jose, CA (US)

( * ) Notice: Subject to any disclaimer, the term of this patent is extended or adjusted under 35 U.S.C. 154(b) by 335 days.

(21) Appl. No.: 16/288,817

(22) Filed: Feb. 28, 2019

(65) Prior Publication Data

US 2020/0265138 A1    Aug. 20, 2020

Related U.S. Application Data

(60) Provisional application No. 62/808,101, filed on Feb. 20, 2019.

(51) Int. Cl.
| | |
|---|---|
| G06F 21/56 | (2013.01) |
| G06F 21/54 | (2013.01) |
| G06Q 20/38 | (2012.01) |

(52) U.S. Cl.
CPC ............ G06F 21/563 (2013.01); G06F 21/54 (2013.01); G06F 21/566 (2013.01); G06Q 20/382 (2013.01); *G06F 2221/2119* (2013.01)

(58) Field of Classification Search
CPC ...... G06F 21/54; G06F 21/564; G06F 21/566; G06Q 20/302
See application file for complete search history.

(56) References Cited

U.S. PATENT DOCUMENTS

| | | | | |
|---|---|---|---|---|
| 8,255,280 | B1 * | 8/2012 | Kay | H04L 67/2842 |
| | | | | 705/26.1 |
| 8,621,621 | B1 * | 12/2013 | Burns | G06F 21/54 |
| | | | | 726/22 |
| 9,407,658 | B1 * | 8/2016 | Kuskov | H04L 63/1425 |
| 9,954,893 | B1 * | 4/2018 | Zhao | H04L 63/1416 |
| 2004/0003248 | A1 * | 1/2004 | Arkhipov | H04L 9/3247 |
| | | | | 713/170 |
| 2012/0042145 | A1 * | 2/2012 | Sehr | G06F 21/53 |
| | | | | 711/163 |
| 2014/0189864 | A1 * | 7/2014 | Wang | H04L 63/1483 |
| | | | | 726/23 |
| 2014/0317744 | A1 * | 10/2014 | Turgeman | H04W 12/06 |
| | | | | 726/23 |

* cited by examiner

*Primary Examiner* — Ellen Tran
(74) *Attorney, Agent, or Firm* — Haynes & Boone, LLP (57) ABSTRACT

Computer system security can be threatened by users who manipulate their software to avoid detection of malicious activities—such as account takeover. Web browser software, for example, can be altered so the browser will report false information about the browser itself and/or the system on which it is running. By providing such false information, a user can try to avoid his system being fingerprinted (e.g. identified) so that the user can more effectively instigate electronic attacks without being detected. This disclosure describes techniques that allow for detection of when a user has tampered with their web browser (e.g., by overriding native code functions in the browser). Detecting that a browser has been tampered with can allow a computer server system to take mitigation actions against potentially malicious users, thus improving computer security.

20 Claims, 5 Drawing Sheets

```
                                         Web Page 205
<!doctype html>
<html lang="en"><head><meta http-equiv="Content Type" ......
......
</head><body>
                    Tampering Detection Code 210

<script type = "text/JavaScript">
    if (typeof Object.getOwnPropertyDescriptor(screen, "availWidth")) != "undefined"
       then {
          availWidth_tampered = true; }
       else {
          availWidth_tampered = false; } if (typeof Object.getOwnPropertyDescriptor(navigator, "platform")) != "undefined"
       then {
          platform_tampered = true; }
       else {
          platform_tampered = false; }
    ....
    transmitToServer(availWidth_tampered, platform_tampered, .....);

</script>

</body>
</html>
```

Web Page 205

`<!doctype html>`
`<html lang="en"><head><meta http-equiv="Content Type" ......`
`......`
`</head><body>`

Tampering Detection Code 210

```
<script type = "text/JavaScript">
if (typeof Object.getOwnPropertyDescriptor(screen, "availWidth")) != "undefined"
then {
    availWidth_tampered = true; }
else {
    availWidth_tampered = false; } if (typeof Object.getOwnPropertyDescriptor(navigator, "platform")) != "undefined"
then {
    platform_tampered = true; }
else {
    platform_tampered = false; }
...
transmitToServer(availWidth_tampered, platform_tampered, ......);
</script>
```

`......`
`</body>`
`</html>`

SECURITY VIA WEB BROWSER TAMPERING DETECTION

RELATED APPLICATIONS

This application claims priority to and the benefit of U.S. Provisional Patent Application 62/808,101, entitled "Improved Security via Web Browser Tampering Detection", filed on Feb. 20, 2019.

TECHNICAL FIELD

This disclosure relates to improvements in computer security that allow for detection of software program modifications, particularly web browser tampering, in various embodiments.

BACKGROUND

Web browsers are commonly used to access online services and data. Users may use a browser such as Google Chrome™, Mozilla Firefox™, Microsoft Edge™, Apple Safari™ and others to view and interact with web services on the internet.

In some cases, a malicious user may perform modifications to a web browser in an effort to defeat computer security techniques, such as system identification/fingerprinting. Applicant recognizes that a modified web browser can frequently be a strong indicator that a user is attempting to perform operations that would bypass or diminish the effectiveness of online security protocols. Applicant thus further recognizes that it would be an advantageous improvement in computer security to be able to detect when a user has modified a web browser in such a way as to try to avoid detection of malicious activities (e.g. account takeover, account abuse, prohibited access to data, etc.).

DETAILED DESCRIPTION

Techniques are described relating to the detection of modified software that is used to access web services. When modified software (e.g. a modified web browser) has been detected, access to a resource (such as a web service) may be denied. Further mitigation actions may also be taken if desired.

Web service providers, such as PayPal.com™, are subjected to online attacks by malicious users. These attacks may include a malicious user trying to access multiple accounts (e.g. account takeover) or otherwise performing multiple actions in a short time period. A typical user, for example, would not try to access 25 unrelated different user accounts within a matter of minutes—thus, such activity may indicate that a malicious user is present. Malicious users may therefore take certain steps to disguise their activity. One such step is modifying a web browser that is used to access web pages.

Unmodified web browsers such as Google Chrome™ etc. include various executable functions that can be accessed to detect properties of the web browser and/or properties of a client system on which the web browser is executing. Such properties may include the height or width in pixels of a browser window, how many cores are on the CPU of a client system, what version of operating system is being run by the client system, etc.

When numerous of these values are collected (possible in connection with other additional values collected from sources beyond a web browser itself), a fingerprint of the client system can be developed. Such a fingerprint may uniquely identify the client system (or at least make the client system highly identifiable amongst millions of other client systems that may use an online service).

By fingerprinting a client system in this manner, an online service provider like PayPal.com™ can keep better track of what actions that client system is taking relative to an online service (such as the payment services offered by PayPal™). If a particular client system—as indicated by its fingerprint—takes a serious of actions that appear suspicious and/or malicious, a security mitigation action can be taken against that client system. Access to an online service for that client system may be halted or rate-limited, for example, or subjected to step-up authentication (e.g. any attempt to access the online service for a client system having taken recent suspicious actions could be met with a requirement for two-factor authentication, as one example).

Such mitigation actions are highly inconvenient for malicious actors, and thus, a malicious actor may desire to avoid having his system fingerprinted in a way that allows an online service provider to track his numerous suspicious actions. The malicious actor may therefore modify his web browser in such a way that allows falsification of browser and system properties. By falsifying these values, the malicious user can make his system look like 25 different particular systems, for example, when trying to access 25 different accounts—rather than giving the appearance that all 25 different access attempts are coming from the same browser and computer system. In this way, malicious actors can obfuscate their techniques and attempt to avoid timely detection.

In particular, a malicious actor may override software functions within a web browser so that these functions cannot be used to effectively fingerprint a client system. The screen-related functions 'screen.availHeight', 'screen.availWidth', 'screen.colorDepth', and 'screen.pixelDepth' for example, can be modified so that instead of returning accurate values, the malicious user can return arbitrary values as desired. By overriding functions such as these, false values can be provided to a website. This reporting of false values can then make effective fingerprinting by an online services provider difficult or even impossible. Overriding browser software functions can be performed in some instances by using a particular modified version of a web browser and/or installing a browser tool or extension.

The techniques of the present disclosure allow for detecting of when browser software functions are overridden (e.g. for the purpose of defeating system fingerprinting techniques and allowing a malicious actor to operate more freely). In various embodiments, a web page transmitted to a client web browser can include code that is executed by the web browser that will be able to detect if one or more particular functions are overridden.

Detection of function overrides for software browser functions is possible because such functions that report properties of the browser and/or system are frequently implemented using native code. A native code function (e.g. a function that executes as native code rather than user-provided code) will respond differently to certain software instructions differently when the native code function has been overridden with non-native code (e.g. user-provided code). In particular, a native code function may throw an exception or otherwise provide a different execution result (e.g. returning an undefined value) when executed in certain contexts, whereas an overridden web browser native code function will not throw such an exception, according to various embodiments. By exploiting this difference, tampering detection code provided to a user's web browser can indicate whether or not the web browser has overridden a native code function (thus indicating that the user may be using one or more tools to obfuscate their identity and avoid system fingerprinting).

If tampering detection code indicates the user web browser has been altered through such function overriding, an online service provider can then conclude that web browser may be attempting to perform one or more malicious actions intended to compromise computer security. (It is highly unlikely that ordinary users would override the native code functions of the web browser, in various embodiments, as there may be generally little reason or a benefit for a non-malicious user to do so.) Once web browser tampering is detected, access to an electronic resource such as an online service can be denied, and other mitigation actions are also possible.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
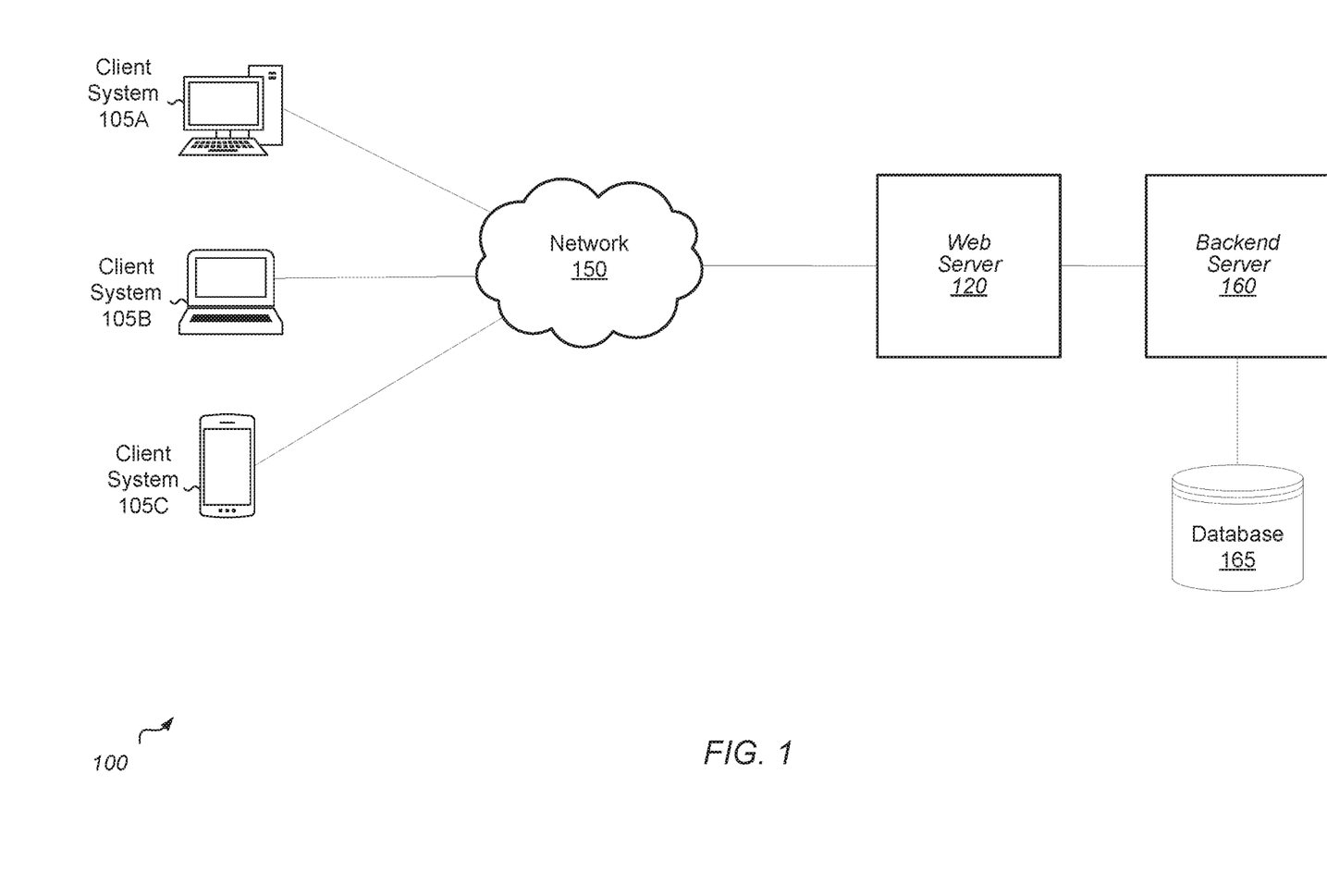
FIG. 1 illustrates a block diagram of a system including client systems, a web server, and a backend server, according to some embodiments.

Turning to FIG. 1, a block diagram of a system 100 is shown. In this diagram, system 100 includes client systems 105A, 105B, and 105C. System 100 also includes web server 120, backend server 160, database 165, and network 150. The techniques described herein can be utilized in the environment of system 100, as well as numerous other types of environment.

Note that many other permutations of FIG. 1 are contemplated (as with all figures). While certain connections are shown (e.g. data link connections) between different components, in various embodiments, additional connections and/or components may exist that are not depicted. As will be appreciated by one of skill in the art, various devices may be omitted from this diagram for simplicity—thus, in various embodiments, routers, switches, load balancers, computing clusters, additional databases, servers, and firewalls, etc., may all be present. Components may be combined with one other and/or separated into one or more systems in this figure, as in other figures.

User systems 105A, 105B, and 105C may be any user computer system that can potentially interact with web server 120, according to various embodiments. Web server 120 may provide web pages facilitate one or more services, such as account access and electronic payment transactions (as may be provided by PayPal.com™). Web server 120 may thus also facilitate access to various electronic resources, which can include an account, data, and various software programs/functionality, etc.

Web server 120 may thus be any computer system configured to provide access to electronic resources. This can include providing web content, in various embodiments, as well as access to functionality provided a web client (or via other protocols, including but not limited to SSH, FTP, database and/or API connections, etc.). Services provided may include serving web pages (e.g. in response to a HTTP request) and/or providing an interface to functionality provided by backend server 160 and/or database 165. Database 165 may include various data, such as user account data, system data, and any other information. Multiple such databases may exist, of course, in various embodiments, and can be spread across one or more data centers, cloud computing services, etc. Web server 120 may comprise one or more computing devices each having a processor and a memory. Network 150 may comprise all or a portion of the Internet.

Web server 120 may correspond to an electronic payment transaction service such as that provided by PayPal™ in some embodiments, though in other embodiments, web server 120 may correspond to different services and functionality. Web server 120 and/or backend server 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via web server 120 and/or backend server 160, including but not limited to stocks, commodities, gift cards, incentive points (e.g. from airlines or hotels), etc. Server system 120 may also correspond to a system providing functionalities such as API access, a file server, or another type of service with user accounts in some embodiments (and such services can also be provided via web server 120 in various embodiments).

Database 165 can include a transaction database having records related to various transactions taken by users of a transaction system in the embodiment shown. These records can include any number of details, such as any information related to a transaction or to an action taken by a user on a web page or an application installed on a computing device (e.g., the PayPal app on a smartphone). Many or all of the records in database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/ type of funding instrument, and any other details. Such information may be used for bookkeeping purposes as well as for risk assessment (e.g. fraud and risk determinations can be made using historical data; such determinations may be made using systems and risk models not depicted in FIG. 1 for purposes of simplicity).

Backend server 160 may be one or more computing devices each having a memory and processor that enable a variety of services. Backend server 160 may be deployed in various configurations. In some instances, all or a portion of the functionality for web services that is enabled by backend server 160 is accessible only via web server 120 (e.g. some of the functionality provided by backend server 160 may not be publicly accessible via the Internet unless a user goes through web server 120 or some other type of gateway system).

Figure 2:
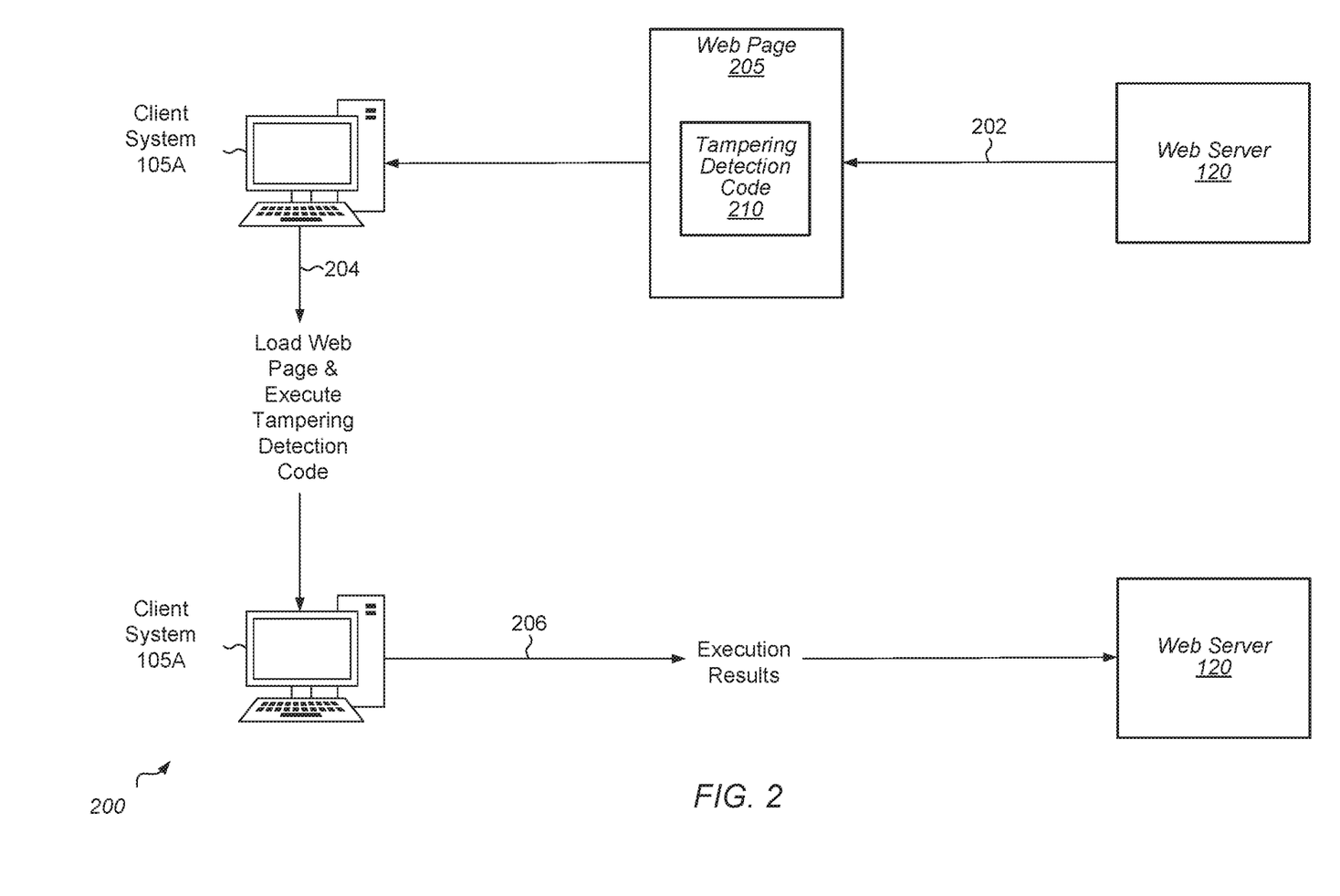
FIG. 2 illustrates a diagram relating to a flow of data between a web server and client system, according to some embodiments.

Turning to FIG. 2, a diagram is shown relating to a flow of data between web server 120 and client system 105A, according to various embodiments.

In action 202, web server 120 transmits a web page 205 to client system 105A (e.g. in response to an HTTP request from a client web browser for that page). Web page 205 includes tampering detection code 210. In action 204, a web browser of client system 105A loads the web page and executes the tampering detection code. Results of the tampering detection code are then transmitted back to web server 120 in action 206. In this way, web server 120 can learn whether a web browser at a client system has been tampered with (possibly indicating malicious activity). Aspects of these techniques are explored in greater detail below.

Figure 3:
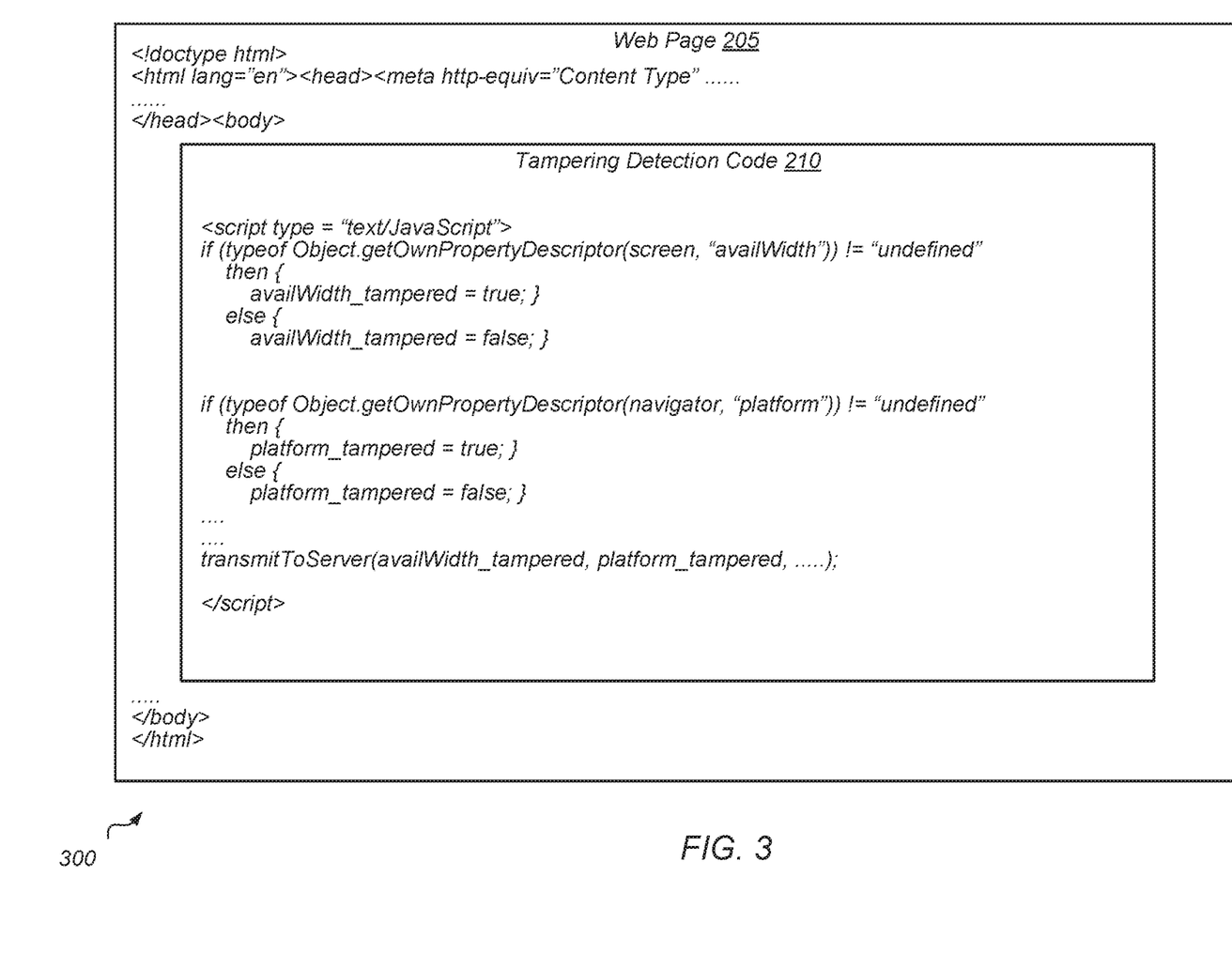
FIG. 3 illustrates a diagram relating to a web page that includes tampering detection code, according to some embodiments.

Turning to FIG. 3, a diagram 300 is shown of web page 205 including tampering detection code 210, according to various embodiments. Web page 205 may be an HTML-based web page, including a variety of markup data, image references, links, etc. Web page 205 may include executable code, such as scripting code.

In this example, tampering detection code 210 includes JavaScript code that is configured to detect if particular native code functions of a web browser have been overridden (i.e. tampered with). In this example, the code checks if the function 'availWidth' (for the screen object in a browser) has been overridden, as well as the function 'platform' (for the navigator object in the browser). Different native code functions can be checked for tampering, and the results of this checking can then be transmitted back to web server 120 (and/or another system). As will be appreciated, the code displayed in diagram 300 is only a partial example, with portions of web page 205 and tampering detection code 210 omitted for clarity and ease of understanding. Many different specific implementations are possible for tampering detection code 210 (and of course, web page 205 as well).

Figure 4:
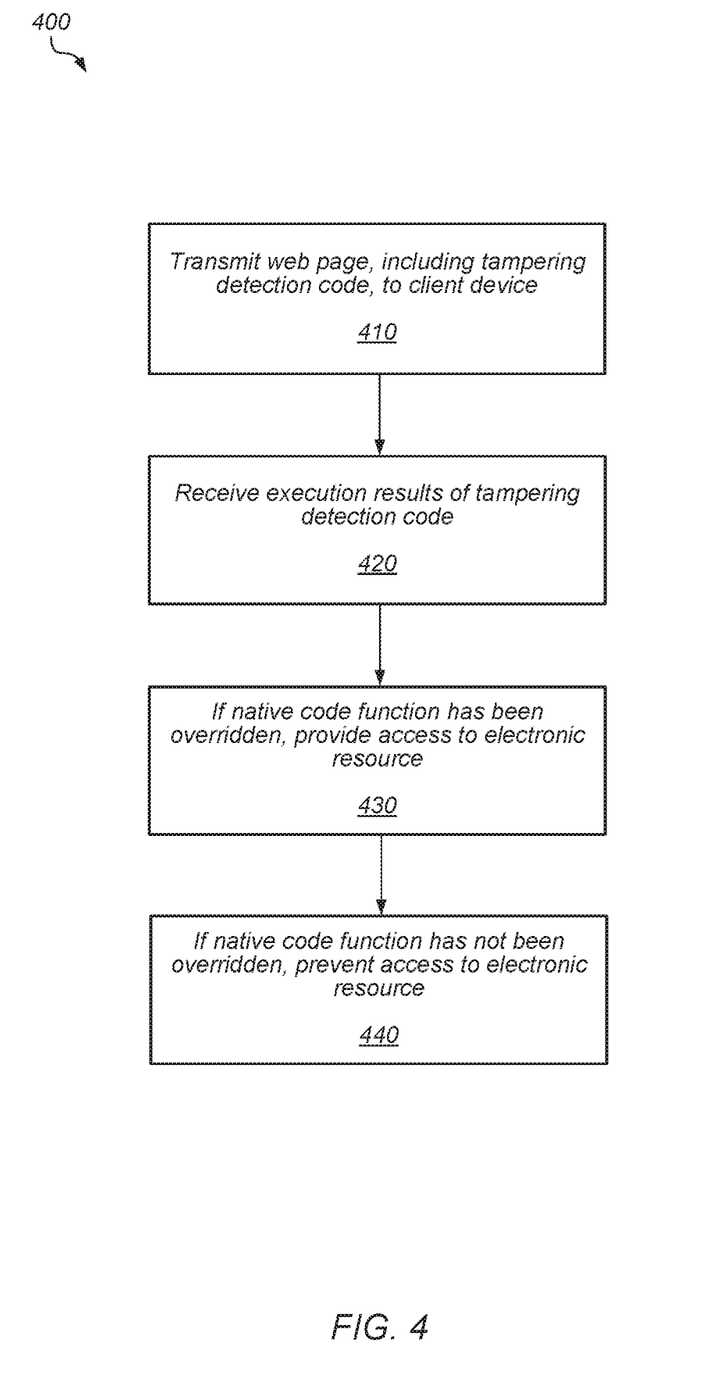
FIG. 4 illustrates a flowchart relating to a method for detecting tampering of web browser software, according to some embodiments.

Turning to FIG. 4, a flowchart is shown of one embodiment of a method 300 relating to detecting tampering of web browser software, according to various embodiments.

Operations described relative to FIG. 4 may be performed, in various embodiments, by any suitable computer system and/or combination of computer systems, including web server 120 and/or backend server 160.

For convenience and ease of explanation, operations described below will simply be discussed relative to web server 120 rather than any other system, however. Further, various elements of operations discussed below may be modified, omitted, and/or used in a different manner or different order than that indicated. Thus, in some embodiments, web server 120 may perform one or more operations while another system might perform one or more other operations.

In operation 410, web server 120 transmits a web page to a client device such as (client system 105A) in response to a request from a web browser of the client device, according to some embodiments.

The term "web browser" as used herein includes any software configured to request, display, and/or interact with web pages on the Internet. Various software listed above (such as Google Chrome™, etc.) are all considered web browsers for purposes of this disclosure, but additional software may also be considered a web browser. A web browser can be any software that is configured to load data from a web page and submit data via a web page, and/or render contents for display on a screen, in various embodiments.

This can include customized software that is not a web browser commercially and widely available for download. For example, in the event that a malicious actor is using customized software that requests a web page and then tries to take an action relative to that web page (e.g. logging into a client account using a password or other security mechanism), such customized software used for these tasks may be considered a web browser. This is true even in the event that the custom software does not operate in an identical manner or enable the exact same spectrum of functionality as another browser—e.g., if a malicious actor is trying to perform a credential stuffing attack, it is possible that they may simply want to try to login to many different user accounts within a short time to see if they can access functionality for those accounts. Thus, in this example, it may not be necessary for the malicious actor to actually see a display of a login web page; all he may care about is whether the login attempt succeeded or not. Accordingly, even if custom software used by a malicious actor does not actively display a web page (e.g. such as a login page), such custom software can still be considered a web browser for purposes of this disclosure as that software is configured to interact with web pages (e.g. load data from the web page and/or submit data via the web page).

In operation 410, the web page transmitted includes tampering detection code that is configured to execute in response to the web page being received by a web browser of a client device, according to various embodiments. Execution of this tampering detection code may include determining whether a native code function of a web browser has been overridden. This may be tampering detection code 210 in various embodiments.

In one embodiment, tampering detection code 210 includes JavaScript code. This JavaScript code can be executed automatically by a web browser when the web browser loads web page 205, for example. (E.g., the JavaScript code may be included in the web page such that upon loading the page, the web browser executes the code without any manual action required by a user to cause the code to execute.)

Tampering detection code 210 determines whether a native code function of a web browser has been overridden, according to various embodiments. In some instances, multiple different native code functions may be checked to see if they have been overridden. An example follows.

One native code function on some web browsers is the JavaScript function 'availHeight'. This function is not defined by an end user of the browser, but is instead implemented by the web browser using native code. A native code function, in various embodiments, refers to a function that is provided via the web browser software itself, rather than being a user-defined function.

When fingerprinting techniques are used to collect values from a web browser that might be helpful in identifying machine, a value for 'screen.availHeight' may be collected. In this instance, 'screen' is the object on which the native function 'availHeight' is executed. Thus, 'screen.availHeight' may report a value such as 877 (pixels). This value can be reported back to web server 120 (along with many other such values, in some instances) to help in fingerprinting a client system.

A malicious user, however, may override the native code function 'availHeight'. For example, a user could insert her own JavaScript code into the browser in a number of different ways, including by installing an extension in the browser. The override code for this could be defined, in one example, as 'screen._defineGetter_("availHeight", function ( ){return 700+Math.floor(Math.random( )*250);}'. This overridden function would then return a random value between 700 and 950 pixels. As will be appreciated, a native code function can be overridden in any number of arbitrary ways, and a malicious user may generate any value desired. In some cases, for example, a malicious user may want to report a specific value that makes a computer system appear to resemble something else (e.g., reporting values such that an Opera™ browser running on a Linux desktop system actually resembles a Safari™ browser running on an Apple™ laptop) so as to try to credibly obfuscate their identity by mimicking real world configurations of other systems.

Tampering detection code 210, however, can determine if a native code function has been overridden. In particular, a native code function may throw an exception or return an undefined value in response to being executed in a certain way, whereas an overridden native code function will not perform in the same manner, according to various embodiments. In the above example using the 'availHeight' function, the native code function needs an object on which to execute (e.g. the 'screen' object), or the function will return an exception. E.g. 'screen.availHeight' may return 877, while simple calling 'availHeight' (with no object) will cause an exception in browsers such as Chrome™, Safari™, etc. If 'availHeight' has been overridden, however, it will still return a value (e.g a random pixel value between 700 and 950) even if executed without an object. Thus, attempting to execute a native code function without the proper direct object for that function can reveal whether a (possibly malicious) user has overridden the native code function.

Another method of checking whether a browser native code function has been overridden is to use the Object.getOwnPropertyDescriptor Javascript function. In this example, the following code statements return the values indicated below:

```
1       navigator.platform
2           --> "MacIntel"
3       typeof Object.getOwnPropertyDescriptor(navigator,
            "platform")
4           --> "undefined"
```

Accordingly, when the native code function for navigator.platform is not overridden, the 'typeof' command shown above will return an undefined value (as indicated in line 4). This would correspond to normal operations for a variety of web browsers.

However, now consider a user that has overridden this native code function using the following command: navigator._defineGetter_("platform", function ( ){return "Android";}. Now, following this override, the function navigator.platform will return a value of "Android", (e.g., falsely making the client system of the user look like a mobile device rather than a desktop system).

This override can be detected, however, by once again executing the statement:

```
1       typeof Object.getOwnPropertyDescriptor(navigator,
            "platform")
2           --> "object"
```

Thus, tampering detection code 210 would expect to see a value of "undefined" in various instances for a native code function, but seeing a different value (e.g. "object") would indicate that function has been overridden. In this fashion, different web browser native code functions can be checked to see if they have been tampered with by a user.

Multiple native code functions in a web browser may be tested (e.g. using tampering detection code 210) to see which of those functions have been overridden. A malicious user's web browser will often have been modified such that numerous different functions are overridden to help obfuscate their identity and prevent system fingerprinting techniques. Thus, tampering detection code 210 can check a list of multiple functions (e.g. any and all functions that might be used by web server 120 to perform a fingerprinting analysis). Such functions can include availHeight, availWidth, colorDepth, and pixelDepth (for the 'screen' object), as just a few examples. Other functions may include appCodeName, appName, appVersion, language, platform, or userAgent (for the 'navigator' object, e.g., navigator.platform). Web browser native code functions that may be checked for tampering are not limited to these examples, however.

Thus, in various embodiments, determining whether a native code function of a web browser has been overridden can be accomplished by checking whether that function returns an exception and/or one particular value (including an undefined value) when applied in a specific context, when overriding the function would instead result in no exception and/or another particular value. These operations by tampering detection code 210 can be performed, in various instances, by using "try-catch" statements when an exception might be thrown to ensure that a web page operates normally (and does not cause a user-visible error) when checking whether native code functions of a web browser have been tampered with.

Turning to operation 420 of FIG. 4, web server 120 receives execution results transmitted by tampering detection code included in a web page, according to various embodiments (thus, the execution results may be received subsequent to web server 120 transmitting a web page to a client device in operation 410). The received execution results may indicate whether a native code function of a web browser has been overridden.

More particularly, in some embodiments, operation 420 includes receiving a plurality of data values for a corresponding plurality of native code functions. Thus, for a given list of native code functions, tampering detection code 210 can indicate which of those functions have been overridden. These results can be delivered in any number of data formats as desired (e.g., a bit vector list could be transmitted with 0 indicating a function is not tampered with, and a 1 indicating it was overridden). In some cases, the faked results from an overridden function may also be reported (e.g., 'availHeight' was an overridden function, and returned a value of 915 (pixels)).

Web server 120 can build a tampering profile for a client system using these results, in some embodiments. For example, a particular browser extension for Google Chrome™ may be known to override certain native code functions in a certain way (some code functions may be overridden while others may not, for example). Falsified values can also be used to form a tampering profile. In the event that a particular client web browser corresponds to a known tampering profile for a particular type of browser modification, this result can be used to further determine how to deal with that client system. For example, if a known malicious hacking tool matches the tampering profile of a user web browser, that user's system may be immediately blacklisted (or another mitigation action could be taken). Conversely, it is possible (although perhaps unlikely) that a legitimate user might use some kind of browser privacy enhancement tool that would obfuscate values but without the apparent intention of breaching computer system security. In the case that a client tampering profile matched that of a known browser privacy enhancement tool, the client system might potentially face a lesser mitigation action (e.g. stepped up authentication for a transaction) or even potentially not facing any mitigation action and being able to access a web service normally, according to various embodiments. Thus, execution results from tampering detection code 210 can be used to identify whether a user appears to be using particular software (e.g. a particular hacking tool) by comparing execution results of the tampering detection code to a number of known tampering profiles for different (possibly malicious) browser modification tools. I.e., if there are 50 different native code functions that are checked by tampering detection code 210, particular ones of those may be overridden by one type of browser modification tool, while different ones of those native code functions may be overridden by another type of browser modification tool.

In operation 430, web server 120 provides access to an electronic resource if a native code function of a web browser has not been overridden, according to some embodiments. Thus, a user on a web page may be provided access to additional web pages and/or data, including access to particular functionality provided by those web page, if the user's browser appears not to have been tampered with (e.g. by virtue of tampering detection code 210 determining that a native code function has not been overridden).

The electronic resource that a user is provided access to in operation 430 may be a particular web page and/or particular data and/or particular functionality enabled via a web page, in some embodiments. Thus, in one embodiment, the functionality of performing an electronic funds transfer is an electronic resource to which a user is given access (e.g. making a payment with a PayPal™ account). Access to a user account (e.g. following a login page), to a database, etc., are thus also examples of electronic resources to which a user can be provided access. Access can be provided by, for example, having web server 120 transmit particular data (e.g. a web page) to the user's web browser, and may also be provided by allowing the user to access data and/or functions on backend server 160 (for example, a user might receive a web page displaying account balance data that was fetched from database 165 via backend server 160).

In one embodiment, a user takes an action on a first web page, such as submitting a form (e.g. username and password), clicking one or more other elements of the first web page, or otherwise providing some input on the first web page that results in data being transmitted back to web server 120 (e.g. an HTTP POST or HTTP GET). The user, if her browser does not appear to have been tampered with, can then be provided access to the electronic resource via the first web page. The first web page could be updated with new data and/or the user could be sent to an additional web page that allows the user to access specific account functionality, specific data, etc.

In operation 440, web server 120 prevents access to an electronic resource if a native code function of a user's web browser has been overridden, according to various embodiments. E.g., if the user appears to have modified their web browser in such a way as to making system fingerprinting more difficult, an inference can be made that the user may be acting maliciously and access to resources can be denied. Note that in various embodiments, only one of operation 430 and 440 will be fully executed (e.g. the user's browser does not appear to have been tampered with, so access is provided, or the user's browser DOES appear to have tampered with, so access is denied).

Prevention of access can be accomplished in a variety of ways, and can include taking a mitigation action against a user and/or the user's computer system. Instead of providing a desired web page, for example, an account for the user could be locked and web server 120 could instead reply with a web page saying that the user must use particular contact information (e.g. customer service telephone number, email address, text message number, chatbot interface link, etc.) to provide additional verification details before the account is unlocked. Such verification details could include a PIN, password, last four digits of social security number, etc., upon receipt and verification of which which the user account could be unlocked. Another mitigation action could include web server 120 deliberately not responding to a user's request (e.g., instead of logging the user in or allowing the user to execute a particular function, the web server could just ignore the contact, which would leave the user's web browser waiting for a reply that will never come). Such an action may be desirable in cases where the certainty of malicious actor is high, for example, as it may slow down the malicious actor from making future attack efforts (stalling out their web browser, which could be executing an automated attack script). Another mitigation action to prevent access to an electronic resource could include increasing a risk score that assesses the risk that a user presents in conducting a particular operation (e.g. making or receiving an electronic payment). For example, a user's risk score (if they have a browser that appears to have been tampered with) could be elevated such that the user will be denied access to transmit funds over a certain amount (e.g. $5), or restricted in some other way.

Computer-Readable Medium

Figure 5:
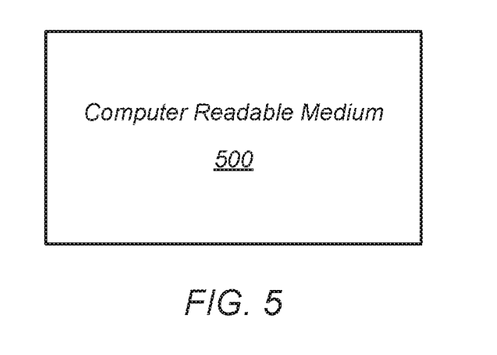
FIG. 5 is a diagram of a computer readable medium, according to some embodiments.

Turning to FIG. 5 a block diagram of one embodiment of a computer-readable medium 500 is shown. This computer-readable medium may store instructions corresponding to the operations of FIG. 4 and/or any techniques described herein. Thus, in one embodiment, instructions corresponding to web server 120 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
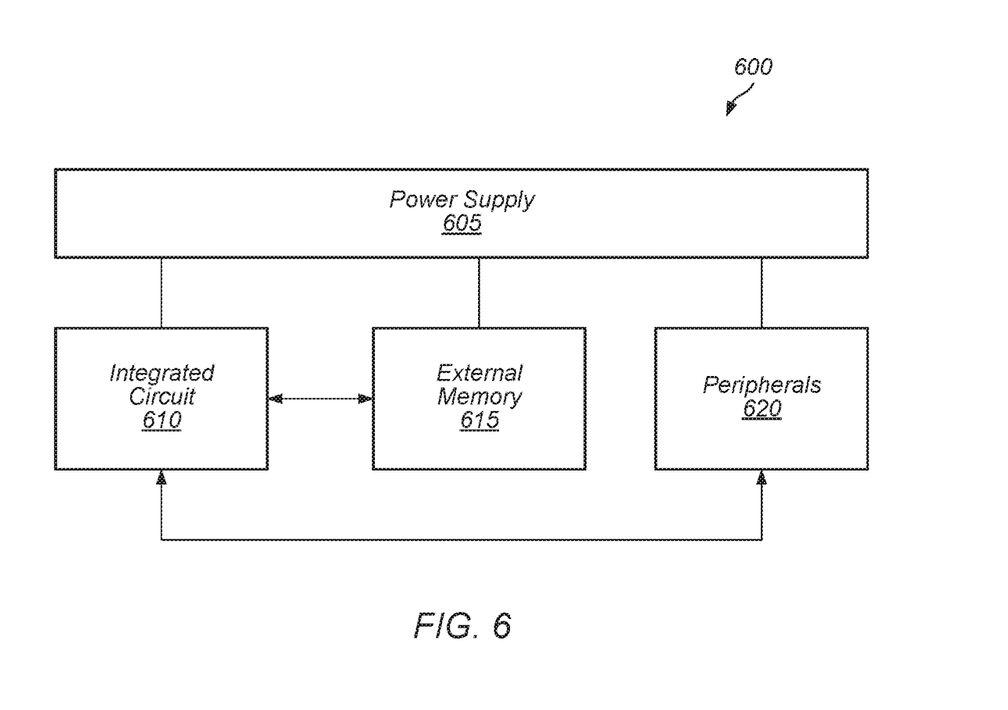
FIG. 6 is a block diagram of a system, according to some embodiments.

In FIG. 6, one embodiment of a computer system 600 is illustrated. Various embodiments of this system may be included in web server 120, backend server 160, or any other computer system.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, cloud computing system, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   a hardware processor; and
   a non-transitory memory having stored thereon instructions that are executable to cause the system to perform operations comprising:
      transmitting a web page to a client device in response to a request from a web browser of the client device for the web page, wherein the web page includes tampering detection code that causes the client device, when executing the tampering detection code, to perform a function call corresponding to a native code function using an incorrect syntax and determining whether an exception or an undefined value is returned from the function call, and wherein the native code function is associated with obtaining an attribute of the web browser or the client device;
      subsequent to the transmitting, receiving execution results transmitted by the client device based on the executing the tampering detection code, wherein the execution results indicate whether the native code function has been overridden based on an output of the function call; and
   determining whether to provide the client device access to an electronic resource via the web page based on the execution results, wherein access to the electronic resource is provided to the client device via the web page when the execution results indicate that the native code function has not been overridden, or wherein access to the electronic resource via the web page is denied when the execution results indicate that the native code function has been overridden.

2. The system of claim 1, wherein the execution results indicate that the native code function has not been overridden, and wherein the operations further comprise providing a user of the client device access to a particular functionality associated with a user account via the web page.

3. The system of claim 2, wherein the particular functionality includes an electronic transfer of funds from the user account to a destination account.

4. The system of claim 1, wherein the execution results indicate that the native code function has been overridden, and wherein the operations further comprise redirecting the web browser of the client device to a second web page.

5. The system of claim 1, wherein the tampering detection code comprises JavaScript code.

6. The system of claim 5, wherein the native code function comprises a JavaScript function that returns a value corresponding to a property of the web browser of the client device.

7. The system of claim 5, wherein the native code function, when being called using a correct syntax, returns a value corresponding to a property of the client device.

8. A non-transitory computer-readable medium having stored thereon instructions that when executed by a computer system cause the computer system to perform operations comprising:
   transmitting a web page to a client device in response to a request from a web browser of the client device for the web page, wherein the web page includes tampering detection code that causes the client device, when executing the tampering detection code, to perform a function call corresponding to a native code function using an incorrect syntax and determining whether an exception or an undefined value is returned from the function call, and wherein the native code function is associated with obtaining an attribute of the web browser or the client device;
   subsequent to the transmitting, receiving execution results transmitted by the tampering detection code, wherein the execution results indicate whether a native code function has been overridden based on an output of the native code function call; and
   determining whether to provide the client device access to an electronic resource via the web page based on the execution results, wherein access to the electronic resource is provided to the client device via the web page when the execution results indicate that the native code function has not been overridden, or wherein access to the electronic resource via the web page is denied when the execution results indicate that the native code function has been overridden.

9. The non-transitory computer-readable medium of claim 8, wherein the execution results indicate that the native code function has been overridden, and wherein the operations further comprise preventing a user of the client device from accessing one or more functionalities associated with a user account.

10. The non-transitory computer-readable medium of claim 9, wherein the operations further comprise redirecting the web browser of the client device to a second web page comprising input fields that enable the user to provide account verification details associated with the user account.

11. The non-transitory computer-readable medium of claim 8, wherein the execution results indicate that the native code function has not been overridden, and wherein the operations further comprise updating the web page with additional data not previously displayed on the web page.

12. The non-transitory computer-readable medium of claim 8, wherein the web browser, when executing the native code function using a correct syntax, is configured to return a value corresponding to a property of the web browser.

13. The non-transitory computer-readable medium of claim 8,
   wherein the tampering detection code further causes the client device to determine whether a second native code function of the web browser has been overridden;
   wherein the execution results further indicate whether the second native code functions have been overridden; and
   wherein the operations further comprise identifying a particular software used to modify the web browser based on a comparison of the execution results to one or more known tampering profiles.

14. A method, comprising:
   a computer system transmitting a first web page to a client device in response to a request from a web browser of the client device, wherein the first web page includes tampering detection code that causes the client device, when executing the tampering detection code, to perform a function call corresponding to a native code function using an incorrect syntax and determining whether an exception or an undefined value is returned from the function call, and wherein the native code function is associated with obtaining an attribute of the web browser or the client device;
   subsequent to the transmitting, the computer system receiving execution results transmitted by the client device based on the executing the tampering detection code, wherein the execution results indicate whether the native code function has been overridden; and
   based on execution results, the computer system determining whether to provide the client device access to an electronic resource.

15. The method of claim 14, further comprising:
   the computer system denying the client device access to the electronic resource when the execution results indicate that the native code function has been overridden.

16. The method of claim 14, wherein the electronic resource includes a particular functionality associated with a user account corresponding to an entity that transmitted the first web page.

17. The method of claim 14, wherein the electronic resource includes specific data accessible via the computer system.

18. The method of claim 14, further comprising:
   providing the client device access to the electronic resource via the first web page when the execution results indicate that the native code function has not been overridden.

19. The method of claim 18, wherein the providing the client device access to the electronic resource comprises transmitting a second web page to the web browser of the client device.

20. The method of claim 14, wherein the client device, when executing the tampering detection code, is further configured to determine whether a second native code function of the web browser has been overridden, and wherein the execution results further indicate whether the second native code function has been overridden.

* * * * *